(No Model.) 4 Sheets—Sheet 1.
A. VAN NESS.
MACHINE FOR MAKING CONFECTIONS.
No. 503,885. Patented Aug. 22, 1893.
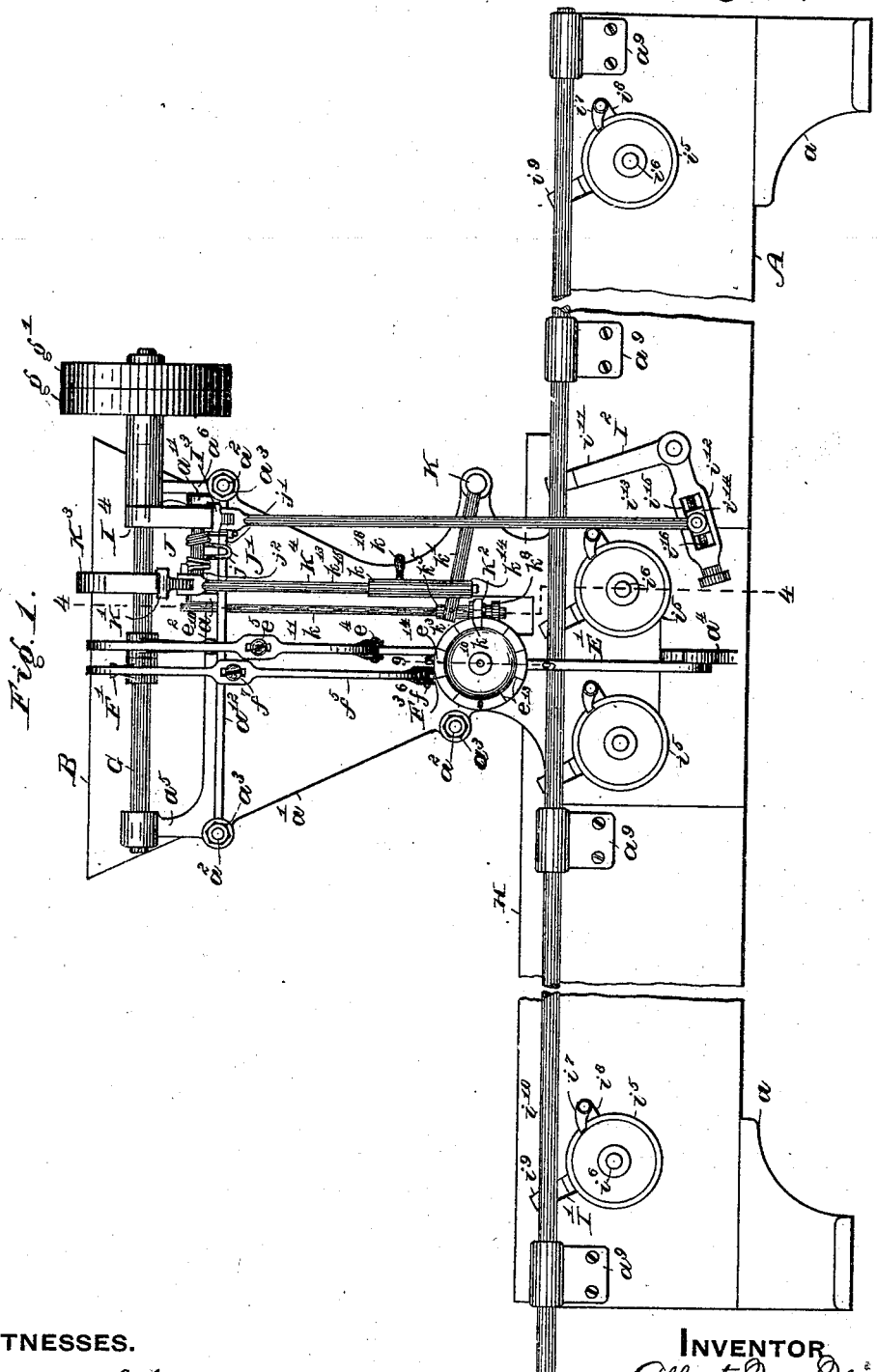
Witnesses.
Kirkley S Hyde.
Myrtie C. Beals
Inventor
Albert Van Ness,
By Albert M. Moore,
ATTORNEY.

(No Model.)  4 Sheets—Sheet 2.
A. VAN NESS.
MACHINE FOR MAKING CONFECTIONS.
No. 503,885.  Patented Aug. 22, 1893.
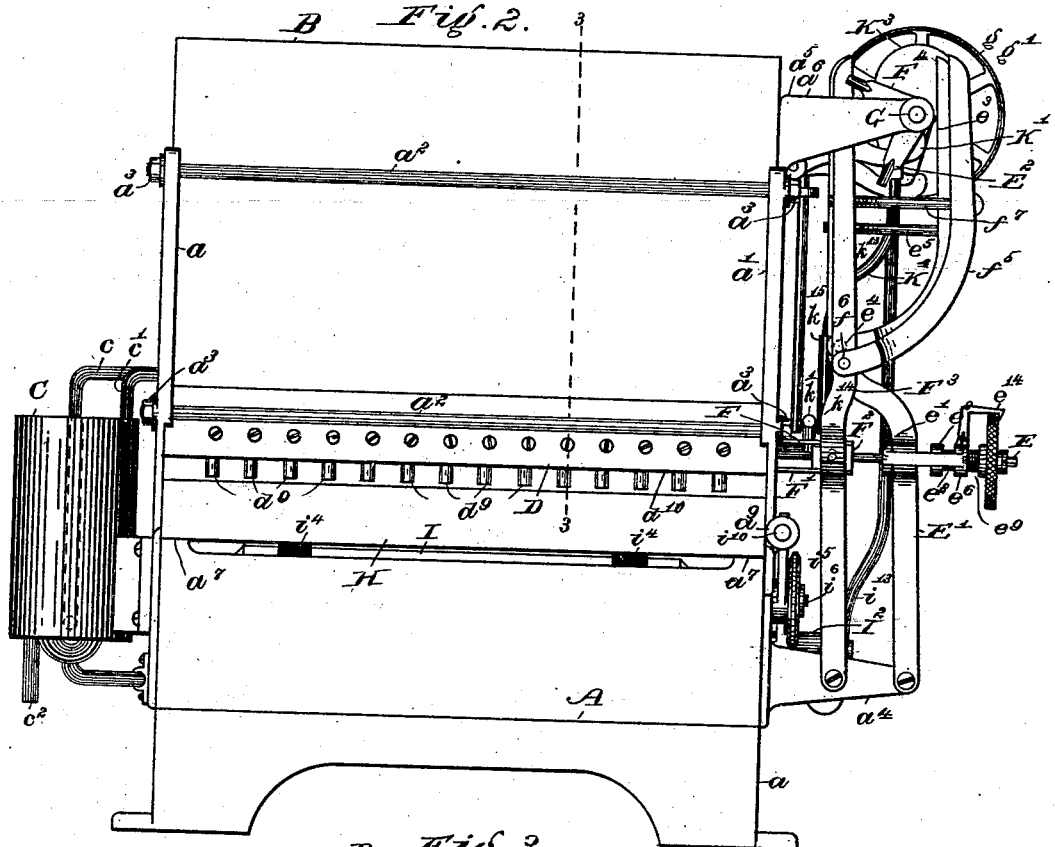
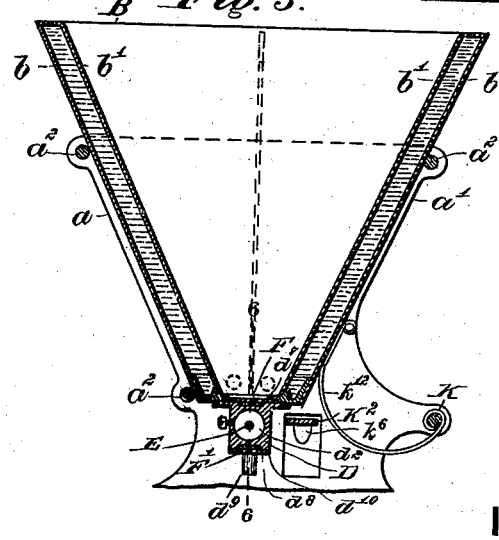
WITNESSES.
Kirkley Hyde,
Myrtie C. Beals.
INVENTOR
Albert Van Ness,
By Albert M. Moore,
ATTORNEY.

(No Model.) 4 Sheets—Sheet 3.

A. VAN NESS.
MACHINE FOR MAKING CONFECTIONS.

No. 503,885. Patented Aug. 22, 1893.

WITNESSES.
Kirkby Hyde
Myrtie C. Beals.

INVENTOR
Albert Van Ness,

By Albert M. Moore,
ATTORNEY.

(No Model.) 4 Sheets—Sheet 4.
A. VAN NESS.
MACHINE FOR MAKING CONFECTIONS.
No. 503,885. Patented Aug. 22, 1893.
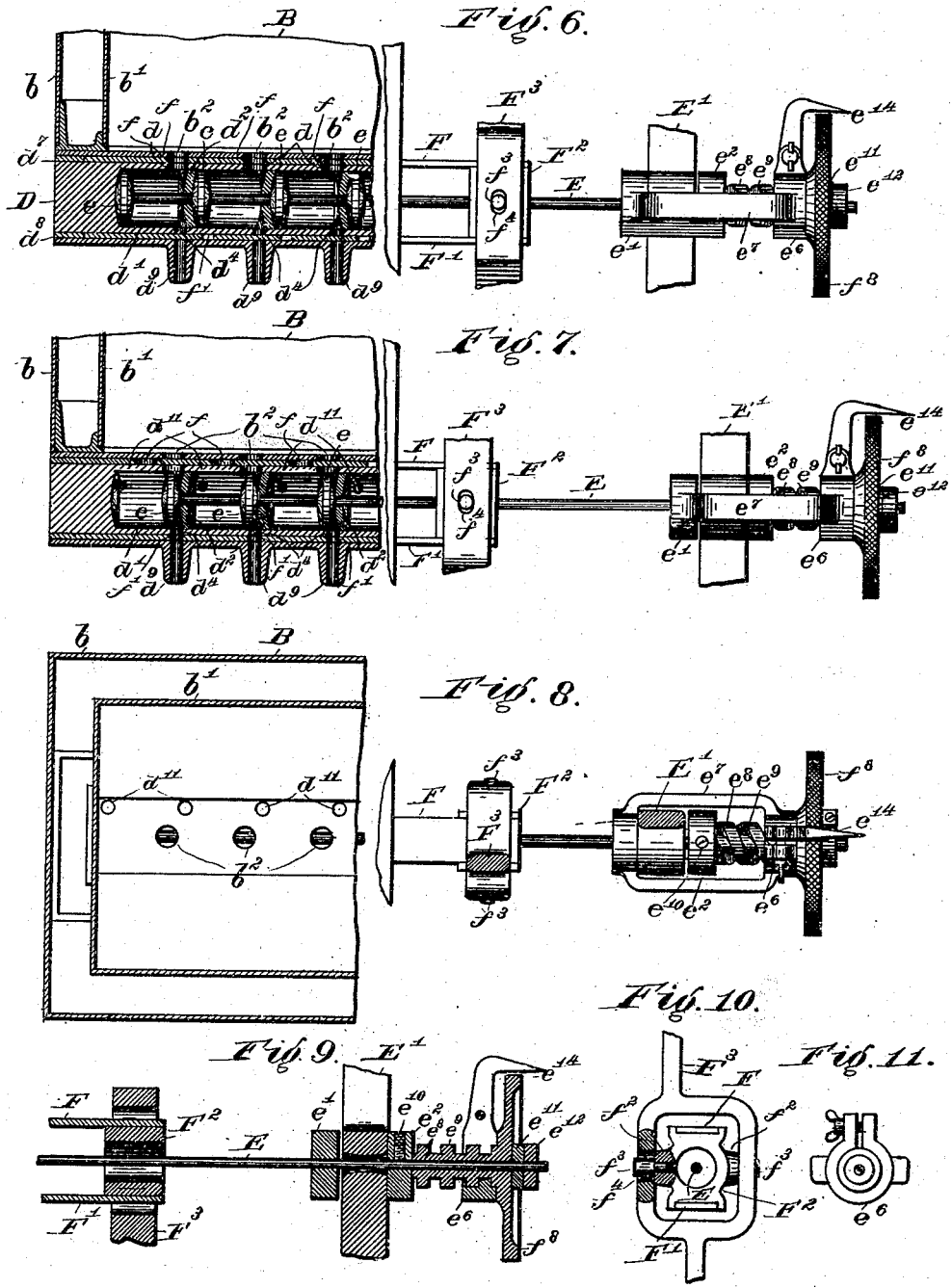

UNITED STATES PATENT OFFICE.

ALBERT VAN NESS, OF LOWELL, MASSACHUSETTS, ASSIGNOR OF ONE-HALF TO WILLIAM A. TROW, OF SAME PLACE.

MACHINE FOR MAKING CONFECTIONS.

SPECIFICATION forming part of Letters Patent No. 503,885, dated August 22, 1893.

Application filed June 13, 1892. Serial No. 436,456. (No model.)

*To all whom it may concern:*

Be it known that I, ALBERT VAN NESS, a citizen of the United States, residing at Lowell, in the county of Middlesex and Commonwealth of Massachusetts, have invented a certain new and useful Improvement in Machines for Making Confections, of which the following is a specification.

My invention relates to machines for making confections of that class which are made by dropping upon a tablet, metallic sheet or into a mold a definite quantity of a creamy or semi-fluid mixture which is retained in its semi-fluid condition by heat and becomes hardened by cooling, and said invention consists in the devices and combinations hereinafter described and claimed.

Figure 4:
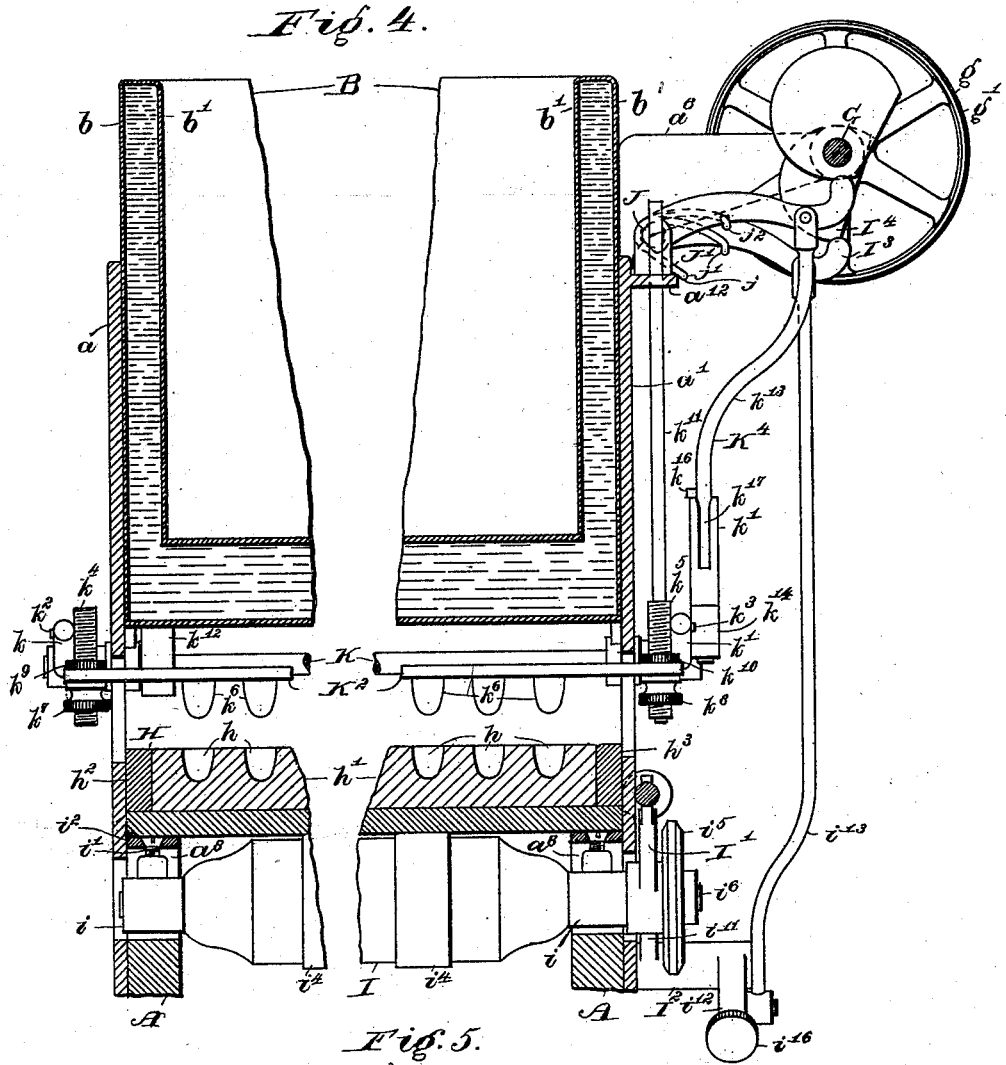
Figure 5:
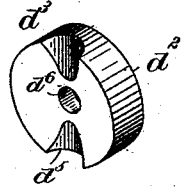

In the accompanying drawings, on four sheets, Figure 1 is a side elevation of a machine, provided with my improvements; Fig. 2, a front elevation of the same; Fig. 3, a section on the line 3 3 in Fig. 2, through the tank, cylinder and printer, showing the upper part of one of the standards in elevation; Fig. 4, a section on the line 4 4 in Fig. 1, looking to the right; Fig. 5, an isometric perspective view of one of the cylinder-heads detached; Fig. 6, a vertical transverse section on the line 6 6 in Fig. 3, of a part of the tank, the cylinder and slides, showing the pistons, piston-rod, means of regulating the throw of the pistons, parts of the slide and piston-lever in rear elevation, the slides being arranged to admit the mixture from the tank into the cylinder and to prevent the escape of said mixture therefrom and the pistons being at the end of the stroke which fills the cylinder from the tank; Fig. 7, like Fig. 6, except that the slides are arranged to prevent the escape of the mixture from the tank and to allow its escape from the cylinder; Fig. 8, a horizontal section of the tank, slide-lever and piston-lever, showing in plan the piston-rod and means of adjusting the throw of the same; Fig. 9 a section on the line 9 9 in Fig. 1, of the slides, slide-lever, piston-lever and means of adjusting the throw of said piston-lever; Fig. 10, a front elevation of the block to which the slides are secured, the slides and the slide-lever, a part of said block and lever and the piston-rod being in section; Fig. 11, a front elevation of the nut and screw which form a part of the means of adjusting the throw of the piston-rod and pistons.

A is a rectangular frame, provided with legs $a$, adapted to stand upon a table or bench or being made long enough to rest upon the floor.

In stands $a'$, connected by cross-ties $a^2$ by means of nuts $a^3$ is supported a tank B. The tank B has double walls $b$ $b'$, the "cream" or mixture being placed within the inner walls $b'$ or inner tank and the outer wall serving as a steam or hot water jacket, the space between said walls being connected by pipes $c$ $c'$ with a boiler C heated by any usual means in a well known manner, the pipe $c^2$ serving as a waste-pipe, to empty the boiler when necessary. The bottom of the tank $b'$ is perforated, at $b^2$, (Figs. 6 to 8) and below said tank is placed the cylinder D which is also provided with perforations $d$ arranged at equal intervals with the perforations $b^2$ and immediately below them. The cylinder D is so called because of its office, it serving the purpose of a pump-barrel or cylinder and is provided with a horizontal cylindrical chamber $d'$, divided into as many compartments as there are perforations $d$ by heads $d^2$, one of which is shown in Fig. 5, one face of each head being arranged at the middle of one of said perforations and being provided with a continuation $d^3$ of said perforations. Said cylinder is provided with other perforations $d^4$, arranged immediately below the perforations $d$, and each head is provided with an upward continuation $d^5$ of one of said perforations $d^4$. Through a hole $d^6$ in the center of each head slides a piston-rod E and to said piston-rod, within each compartment of the cylinder, is secured a piston $e$, said pistons and their compartments forming a series of pumps, having a common piston-rod. The cylinder D, for convenience, is externally rectangular in cross section, as represented in Fig. 3, and is grooved at the top and bottom, at $d^7$ $d^8$, for the reception of the slides F F', each of said slides being provided with perforations $f f'$, arranged at equal intervals with the perforations $d d^4$, but the perforations and slides being so arranged that when the perforations $f$ are in line with the perforations $d$ the perforations $d^4$ are closed by the lower slide F' and so that when the perforations $f'$ of the lower slide are in line with the perforations $d^4$, the perforations $d$ are closed by the upper slide F. The slides F F' are rigidly secured to the block $F^2$, provided with hubs $f^2$, into which are driven screws $f^3$ through slots $f^4$ in the sides of the slide-lever $F^3$. The lower end of the slide-lever $F^3$ is pivoted on a bracket $a^4$ which projects from the frame A, (see Fig. 2,) and the upper end of said lever is forked, one branch $f^5$ of said fork being adjustably pivoted, at $f^6$, to the body of said slide lever to take up any lost motion between said slide-lever and the wiper or cam $F^4$ which gives to said lever and therefore to the slides F F' a reciprocating movement, the means of adjustment being a bolt $f^7$ which passes freely through said branch $f^5$ and screws into said lever $F^3$ and turns said branch on its pivoted lower end. In a similar manner, the piston-rod E is given an endwise reciprocating movement by means of the piston-lever E', through a hole in which said piston-rod passes, collars $e'$ $e^2$ being secured on said piston-rod in front of and in the rear of said piston-lever. The piston-lever is on the same bracket $a^4$ with the slide-lever and is operated in a similar manner by a wiper or cam $E^2$ and has an adjustable branch $e^3$, pivoted at $e^4$ to said piston-lever, substantially as the branch $f^5$ is pivoted to the slide-lever, the movable branch $e^3$ being adjustable by a bolt $e^5$ in form and function corresponding to the bolt $f^6$ above described. The wipers $F^4$ $E^2$ are fast on the main shaft G which turns in suitable brackets $a^5$ $a^6$, cast or otherwise secured on the right stand $a'$ and is provided with fast and loose pulleys $g$ $g'$, to receive a belt from any convenient motor, or, of course, said shaft may be turned by hand. The wipers $F^4$ $E^2$ are so arranged on the main shaft with reference to each other that the slides F F' are at rest while the pistons $e$ are in motion and the pistons are at rest while the slides are in motion. When said slides and pistons are in the positions shown in Fig. 6, with the upper perforations $d$ or inlets open from the tank into the cylinder, the cylinder D is already filled with the mixture. The slides are then moved into the positions shown in Fig. 7, while the pistons are at rest, closing said inlets $d$ and allowing the mixture to be discharged from the cylinder by the subsequent movement of the pistons to the positions shown in Fig. 7, the mixture being directed downward by the short spouts $d^9$, arranged on the plate $d^{10}$ in line with the perforations $d^4$ or outlets, said plate $d^{10}$ being secured to the under side of said cylinder below the lower slide F'.

In order that the pistons may work freely and without the necessity of creating a vacuum behind them on the discharge-stroke or of compressing air on the return-stroke, other perforations $d^{11}$ or vents (Fig. 8) are made from the tank into the cylinder at the rear of the upper slide F, said last-named perforations $d^{11}$ always being open and permitting the flow of the mixture into and out of the cylinder behind the pistons.

The length of the return-stroke of the pistons $e$ may be varied, to vary the amount of the mixture received into each compartment of the cylinder and therefore the amount discharged at the following discharge-stroke, by making the collar $e'$ adjustable on the piston-rod E. I therefore attach the said collar $e'$ to a nut $e^6$ by arms $e^7$ which extend in front of and behind the piston-lever E' and prevent said nut from turning on said piston-rod (Figs. 6 to 9), said nut surrounding and engaging the thread of a screw $e^8$, formed on the sleeve-like hub $e^9$ of a hand-wheel $f^8$ which turns loosely on said piston-rod E, near its free end, and is prevented from advancing on said piston-rod by the collar $e^2$, secured by the set-screw $e^{10}$ on said piston-rod and by other collars or a nut and check-nuts $e^{11}$ $e^{12}$ on the free end of said piston-rod. It is evident that when the space between the collars $e'$ $e^2$ is just sufficient to allow the working of the piston-lever E', the piston-rod will have its full stroke and that by turning the hand-wheel in the proper direction to move the collar $e'$ nearer to the cylinder D, the return-stroke of said piston-rod will be shortened, said piston-lever then having a lost motion between said collars, but moving said piston-rod on the discharge-stroke sufficiently to empty the cylinder, the position of the collar $e^2$ being unchanged. The face of the hand-wheel is graduated at $e^{13}$, as shown in Fig. 1, and the index-finger $e^{14}$, secured on the nut $e^6$, reaches over said wheel and points to said graduations, the numbers on the graduations indicating the quantity discharged at one time from a single compartment of the cylinder or the size of the drops.

The frame A is provided with horizontal longitudinal ways $a^7$, secured to the side-rails of said frame and on these ways may be placed a slab or metallic sheet, such as is used in making peppermints, for instance, to receive the drops from the discharge-spouts $d^9$.

In making chocolate-drops or drops of other special shapes, it is customary to use molds consisting of plates having permanent recesses of the shape desired to be given to the drops, but more commonly depressions $h$ (Fig. 4) are made in a body of corn-starch $h'$ arranged in a shallow box or tray H, sometimes called a "starch-box," the top of the starch being struck off level by a straight edge, the sides $h^2$ $h^3$ of the starch-box acting as guides for the straight edge, and the depressions being made by a strip of wood or other material, provided with projections on the under side, of the size and shape of the required depressions. Such plates, molds or starch-boxes may be used on the ways $a^7$ and advanced thereon by hand after each discharge-stroke of the piston-rod to bring successive rows of the depressions or molds under the discharge-spouts $d^9$.

I have provided feed-rolls I, journaled in suspended adjustable boxes $i$, arranged in recesses $a^8$ in the ways $a^7$ and supported by screws $i'$ which pass through supporting-plates $i^2$ and turn therein without advancing and enter threaded holes in the tops of said journal-boxes $i$, so that, by turning said screws, the axes of said feed-rolls I may be brought into parallelism with the bottom of the cylinder D and the working surfaces of said feed-rolls may be raised sufficiently to engage the bottoms of the starch-boxes or other molds and cause said boxes or molds to advance as said feed-rolls are rotated. The feed-rolls are preferably each provided with two concentric annular surfaces $i^4$, to engage such starch-boxes or molds at two points equally distant from the middle of such feed-roll, to avoid the necessity of making the entire surface of the feed-roll cylindrical and true. Each feed-roll I is given an intermittent rotary motion by means of a friction wheel $i^5$ (Figs. 1, 2 and 4), fast on the shaft $i^6$ of said feed-roll and engaged by a friction-pawl $i^7$, pivoted on one arm $i^8$ of a bell-crank lever I' which turns on said feed-roll shaft, the other arm $i^9$ of said lever I' reaching up through a slot in a rod $i^{10}$, supported in brackets $a^9$, secured to the side of the frame A, said rod $i^{10}$ having a longitudinal reciprocating motion from another bell-crank lever I$^2$, one arm $i^{11}$ of which passes through a slot in said rod $i^{10}$ and the other arm $i^{12}$ of which is pivoted to the lower end of the connecting rod $i^{13}$, the upper end of said connecting rod $i^{13}$ being pivoted to a feed-lever I$^3$, having its fulcrum on the horizontal rod J which is supported in brackets $a^{10}$ $a^{11}$ on the stand $a'$, the free end of said feed-lever being pressed downward by the feed-cam I$^4$, fast on the main shaft G and raised by the spring J', the same being represented as a wire, the double middle portion $j$ of which presses against the stand $a'$ or against a ledge $a^{12}$ projecting from said stand, the branches of said wire being coiled about said rod J and the ends $j'$ $j^2$ of said wire being bent under said feed-lever I$^3$ and under the printing lever K', hereinafter described. The movement of the feed-rolls takes place while the pistons and slides are at rest or during the return-stroke of the pistons and the amount of motion of said rolls may be increased or diminished by moving the lower end of the connecting-rod $i^{13}$ farther from or nearer to the fulcrum of the lever I$^2$, the lower arm $i^{12}$ of said lever being provided with a nut or block $i^{14}$, to which said connecting rod is pivoted and which is movable in a slot $i^{15}$ by means of a screw $i^{16}$ which turns in said lower arm without advancing and engages the thread of said nut. The feed may thus be proportioned to the distance apart of the transverse rows of molds or prints which receive the drops from the cylinder D.

Although permanent or previously-prepared molds may be used with the machine above described, I have made provision for making the molds or prints in the machine. A rock-shaft K is journaled in the stands $a$ $a'$ and is provided with parallel arms $k$ $k'$, pivoted, at $k^2$ $k^3$, to adjusting screws $k^4$ $k^5$ which pass vertically through the printer K$^2$, said printer being a transverse strip, preferably of wood, and provided with downward projections $k^6$, equal in number to the discharge-spouts $d^9$ and arranged at corresponding intervals therewith in front of said spouts. By means of nuts $k^7$ $k^8$ and check-nuts $k^9$ $k^{10}$, turning on the screws $k^4$ $k^5$ above and below the printer K$^2$, the ends of said printer are raised or lowered, to bring the printer parallel with the top of the starch-box H and the printer is so guided that the axes of the projections $k^6$ are maintained in a nearly vertical position by a guide-rod $k^{11}$ or unthreaded prolongation of the screw $k^5$, which guide-rod near its upper end slides vertically in a hole through the ledge $a^{12}$. But the printer K$^2$ (shown in its highest position in Fig. 4) in descending moves in a curve, owing to its connection with the arms of the rock-shaft K, and causes the projections $k^6$ when entering the starch to draw slightly away from the row of prints last-previously formed and avoids the breaking down or filling up of the latter. The rock-shaft K is given an oscillating motion, in one direction, by a spring $k^{12}$ (Fig. 3), secured to said rock-shaft and to the stand $a'$, the tendency of said spring to straighten turning the rock-shaft in a direction to raise the printer K$^2$,—and in the other direction, by the action of the printing-cam K$^3$ on the printing-lever K', said last-named lever being like the feed-lever I$^3$, in shape and pivoted on the same rod J therewith and raised against the feed-cam by the spring J' above described, said printing-lever K' being connected to the arm $k'$ of said rock-shaft by the connecting-rod K$^4$. The connecting-rod K$^4$ is formed in two parts $k^{13}$ $k^{14}$, the upper part $k^{13}$ being a rod, pivoted at its upper end to said printing-lever K', and the lower part $k^{14}$ being a sleeve which loosely surrounds the lower part of said rod $k^{13}$ and is pivoted to the arm $k'$ of the rock-shaft. Another sleeve $k^{15}$ surrounds said rod $k^{13}$ and rests upon the sleeve $k^{14}$ and is preferably provided with a handle $k^{18}$, by which it may be turned about the rod or part $k^{13}$, the latter having a stud $k^{16}$ which, when the printing devices are in use, rests upon the top of the sleeve $k^{15}$ but when said last-named sleeve is turned sufficiently drops down into a vertical slot $k^{17}$, with which said sleeve $k^{15}$ (Fig. 4) is provided, allowing the printing lever to reciprocate without moving the rock-shaft or printer, the stud $k^{16}$ simply rising and falling in the slot $k^{17}$. The printing-cam is secured on the main shaft G and is shaped and arranged to cause the descent of the printer at the same time with the discharge of the mixture or cream from the cylinder D into the transverse row of prints made by the last previous descent of the printer.

I claim as my invention—

1. The combination of the tank, the cylinder, having a series of compartments, each provided with an inlet and with an outlet, a slide arranged and adapted alternately to open and close said inlets, another slide arranged and adapted to keep said outlets closed when said inlets are open and to open said outlets when said inlets are closed, and reciprocating pistons arranged in said compartments, as and for the purpose specified.

2. The combination of a tank, a cylinder, having a series of compartments, each provided with an inlet and with an outlet at the same end thereof, a slide arranged and adapted alternately to open and close said inlets, another slide arranged and adapted to keep said outlets closed when said inlets are open and to open said outlets when said inlets are closed, and reciprocating pistons, each arranged in one of said compartments, each compartment being also provided with a vent at the opposite end thereof from said inlets and outlets, as and for the purpose specified.

3. The combination of the tank, the cylinder, having a series of compartments, each provided with an inlet and with an outlet, a slide, arranged and adapted alternately to open and close said inlets, another slide arranged and adapted to keep said outlets closed when said inlets are open and to open said outlets when said inlets are closed, a piston-rod, common to all said compartments, and pistons, each arranged in one of said compartments and fast on said piston-rod, as and for the purpose specified.

4. The combination of the tank, the cylinder, having a series of compartments, each provided with an inlet and with an outlet, a slide, arranged and adapted alternately to open and close said inlets, another slide, arranged and adapted to keep said outlets closed when said inlets are open and to open said outlets when said inlets are closed, a piston-rod, common to all said compartments, and pistons, each arranged in one of said compartments and fast on said piston-rod, a piston-lever, jointed to said piston-rod and provided with a fork at its upper end, and a cam or wiper, arranged to rotate in said fork, to give said lever, piston-rod and pistons a reciprocating movement, as and for the purpose specified.

5. The combination of the tank, the cylinder, having a series of compartments, each provided with an inlet and with an outlet, a slide, arranged and adapted alternately to open and close said inlets, another slide arranged and adapted to keep said outlets closed when said inlets are open and to open said outlets when said inlets are closed, a piston-rod, common to all said compartments, and pistons, each arranged in one of said compartments and fast on said piston-rod, a piston-lever, jointed to said piston-rod and provided with a fork at its upper end, and a cam or wiper, arranged to rotate in said fork, one branch of said fork being adjustable in distance from the other, to take up lost motion between said cam and lever, as and for the purpose specified.

6. The combination of a tank, a cylinder, having a series of compartments, each provided with an inlet and with an outlet, a slide, arranged and adapted alternately to open and close said inlets, another slide arranged and adapted to keep said outlets closed when said inlets are open and to open said outlets when said inlets are closed, a piston-rod, common to all said compartments, and pistons, each arranged in one of said compartments and fast on said piston-rod, a piston-lever, provided with a hole, through which said piston-rod passes, collars on said rod on opposite sides of said lever, one of said collars being fixed on said rod and the other of said collars being adjustable on said rod, to vary the length of the stroke of said pistons, as and for the purpose specified.

7. The combination of a tank, a cylinder, having an inlet and an outlet, a piston-rod, a piston, located in said cylinder and fast on said piston-rod, a piston-lever, provided with a hole, through which said piston-rod passes, collars on said rod on opposite sides of said lever, one of said collars being fixed on said rod, and a nut, to which the other of said collars is secured, and a sleeve, provided with a screw-thread and turning without advancing on said rod in said nut, to vary the distance between said collars and thereby to vary the length of the stroke of said piston, as and for the purpose specified.

8. The combination of a tank, a cylinder, having an inlet and an outlet, a piston-rod, a piston, arranged in said cylinder and fast on said piston-rod, a piston-lever, provided with a hole, through which said piston rod passes, collars on said rod on opposite sides of said lever, one of said collars being fixed on said rod, a non-rotary nut, to which the other of said collars is secured, a sleeve, provided with a screw-thread and turning without advancing on said rod, a graduated hand-wheel or dial, turning with said sleeve, and a non-rotary index-finger, to vary the length of the stroke of said piston and to indicate said length, as and for the purpose specified.

9. The combination of the rock-shaft, provided with arms, the printer, carried by said arms, the printing-cam and cam-lever, and a rod, connecting said cam-lever and one of the arms of said rock-shaft, as and for the purpose specified.

10. The combination of the rock-shaft, provided with arms, a spring, to move said rock-shaft in one direction, the printer supported by said arms, the printing cam and cam-lever, a sleeve, connected to one of said arms, a rod, having a lateral projection or stud and pivoted to said lever and sliding in said sleeve, another sleeve, surrounding said rod below said stud and resting on said first-named sleeve and having a vertical slot, in which said stud may have a vertical motion, as and for the purpose specified.

11. The combination of the feed-rolls, provided with friction-wheels, levers turning on the shafts of said rolls, and carrying friction-pawls to engage said friction-wheels, a longitudinally-sliding rod, connecting all said levers, another lever, one arm of which is connected to said rod, a connecting-rod, pivoted at one end to the other arm of said last-named lever and at the other end to a feed-lever, a spring, operating said feed-lever in one direction, and a cam, operating said lever in the other direction, as and for the purpose specified.

12. The combination of the feed-cam, the feed-lever, the longitudinally-sliding rod, a lever, connected to one arm of said last-named lever, a block, sliding in the other arm of said last-named lever, a screw, to vary the distance of said block from the fulcrum of said lever, a connecting-rod, pivoted to said block and to said feed-lever, feed-rolls, having wheels, and other levers, operated by said longitudinally-sliding rod and having pawls to engage said wheels, to vary the amount of movement of said rolls, as and for the purpose specified.

13. The combination of the cylinder, heads dividing said cylinder into compartments, each of which is provided with an inlet and with an outlet, said heads having grooves which form continuations of said inlets and outlets, and reciprocating pistons, arranged in said compartments, as and for the purpose specified.

In witness whereof I have signed this specification, in the presence of two attesting witnesses, this 31st day of May, A. D. 1892.

ALBERT VAN NESS.

Witnesses:
ALBERT M. MOORE,
MYRTIE C. BEALS.